US008249598B1

(12) United States Patent
Khanka et al.

(10) Patent No.: US 8,249,598 B1
(45) Date of Patent: Aug. 21, 2012

(54) PROBING TO DISAMBIGUATE A REPORTED PILOT SIGNAL SO AS TO FACILITATE HANDOFF

(75) Inventors: Bhagwan Khanka, Lenexa, KS (US); Hemanth B. Pawar, Herndon, VA (US); Shilpa Kowdley Srivinas, Herndon, VA (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1115 days.

(21) Appl. No.: 12/131,243

(22) Filed: Jun. 2, 2008

(51) Int. Cl.
*H04Q 7/20* (2006.01)

(52) U.S. Cl. ........ 455/437; 455/436; 455/438; 455/439; 455/440; 455/442; 455/443; 370/331; 370/320; 370/332; 370/335

(58) Field of Classification Search .................. 455/436, 455/438, 437, 439, 440, 441, 442, 444, 449, 455/450, 451; 370/331, 332, 333, 335, 320; 709/203
See application file for complete search history.

(56) References Cited

U.S. PATENT DOCUMENTS

| | | | |
|---|---|---|---|
| 5,982,758 A | 11/1999 | Hamdy | |
| 6,075,990 A | 6/2000 | Shin | |
| 6,137,783 A | 10/2000 | Sallberg | |
| 6,167,268 A | 12/2000 | Souissi et al. | |
| 6,185,421 B1 | 2/2001 | Alperovich et al. | |
| 6,285,874 B1 | 9/2001 | Magnusson et al. | |
| 6,377,560 B1 | 4/2002 | Dailey | |
| 6,714,789 B1 | 3/2004 | Oh et al. | |
| 7,076,256 B1 | 7/2006 | Orler et al. | |
| 7,092,722 B1 | 8/2006 | Oh et al. | |
| 7,180,879 B2 | 2/2007 | Sinnarajah et al. | |
| 7,333,797 B2 | 2/2008 | Thorson | |
| 7,787,421 B2 | 8/2010 | Ramanna et al. | |
| 2003/0035393 A1 | 2/2003 | Sinnarajah et al. | |
| 2003/0119535 A1 | 6/2003 | Needham et al. | |
| 2004/0110511 A1 | 6/2004 | Schmidt et al. | |
| 2006/0068813 A1 | 3/2006 | Ku et al. | |

(Continued)

FOREIGN PATENT DOCUMENTS

EP 0 926 844 6/1999

OTHER PUBLICATIONS

U.S. Appl. No. 11/831,373, filed Jul. 31, 2007 entitled Method for Use of Azimuth and Bearing Data to Select a Serving Sector for a Mobile Station.

(Continued)

*Primary Examiner* — Ajit Patel
*Assistant Examiner* — Fred Casca

(57) ABSTRACT

A method is disclosed for disambiguating a reported pilot signal so as to facilitate handoff of a mobile station. When a radio access network (RAN) receives from a mobile station a handoff request carrying a parameter that ambiguously identifies at least two sectors as the potential handoff target, the RAN will send a test probe on at least one of the potential handoff target sectors and will determine, based on mobile station response to the test probe, which sector the mobile station received the test probe on and thus which sector was the intended handoff target. The RAN may then direct the mobile station to hand off to that sector if appropriate. Further, the RAN may add the identified sector into a neighbor list of a similarly situated other mobile station, to allow the other mobile station to more efficiently hand off to the same sector if appropriate.

20 Claims, 5 Drawing Sheets

U.S. PATENT DOCUMENTS

| | | |
|---|---|---|
| 2006/0217118 A1 | 9/2006 | Benco et al. |
| 2008/0014946 A1* | 1/2008 | Kubota .................... 455/436 |
| 2008/0076436 A1 | 3/2008 | Sanders et al. |
| 2008/0113670 A1 | 5/2008 | Dufour et al. |
| 2008/0123851 A1* | 5/2008 | Guccione et al. ............ 380/270 |
| 2008/0146252 A1 | 6/2008 | Razdan et al. |
| 2009/0219888 A1 | 9/2009 | Chen et al. |

OTHER PUBLICATIONS

Hsiao-Kuang Wu et al., "Personal Paging Area Design Based on Mobile's Moving Behaviors," INFOCOM, vol. 1, pp. 21-30, 2001.

I.F. Akyildiz et al., Abstract of "Movement-Based Location Update and Selective Paging for PCSnetworks," IEEE/ACM Transactions, vol. 4, Issue 4, p. 629, Aug. 1996.

* cited by examiner

PROBING TO DISAMBIGUATE A REPORTED PILOT SIGNAL SO AS TO FACILITATE HANDOFF

BACKGROUND

Cellular wireless is an increasingly popular means of personal communication in the modern world. People are using cellular wireless networks for the exchange of voice and data over cellular telephones, Personal Digital Assistants (PDAs), cellular modems, and other devices. In principle, a user can seek information over the Internet or call anyone over the Public Switched Telephone Network (PSTN) from any place inside the coverage area of the cellular wireless network.

In a typical cellular wireless system, an area is divided geographically into a number of cell sites provided by a radio access network (RAN). The RAN typically comprises one or more base transceiver stations (BTSs), each of which has one or more antennas that radiate to define a radio frequency (RF) radiation pattern. The BTS(s) of the RAN may then be coupled with a base station controller (BSC) or radio network controller (RNC), which may in turn be coupled with a telecommunications switch or gateway, such as a mobile switching center (MSC) or packet data serving node (PDSN) for instance. The switch or gateway may then provide connectivity with a transport network, such as the public switched telephone network (PSTN) or the Internet for instance.

When a mobile station (such as a cellular telephone, a wirelessly equipped PDA or personal computer, or another suitably equipped device) is positioned in a cell, the mobile station communicates via an RF air interface with the BTS of the cell. Consequently, a communication can be established between the mobile station and another entity, via the air interface and the RAN.

With the explosive growth in demand for wireless communications, the level of call traffic in most cell sites has increased drastically over recent years. To help manage the call traffic, most cells in a wireless network are usually further divided geographically into a number of sectors (which can be visualized ideally as pie pieces), each defined respectively by radiation patterns from directional antenna components of the respective BTS, or by respective BTS antennae. As such, each sector has an azimuth, which is understood to be the general direction of radiation of the sector, such as the direction the antenna of the sector is pointing.

In a Code Division Multiple Access (CDMA) wireless network and perhaps in other types of networks, each cell employs one or more carrier frequencies, and each sector is distinguished from adjacent sectors by a pseudo-random number offset (PN offset). Further, each sector may concurrently communicate on multiple different channels, distinguished by "Walsh codes". When a mobile station operates in a given sector, communications between the mobile station and the BTS of the sector are carried on a given frequency and are encoded by the sector's PN offset and, perhaps, a given Walsh code.

According to well known industry standards, a mobile station can communicate with a number of "active" sectors at a time. Depending on the system, the number of active sectors may be up to three or six, for instance. The mobile station receives largely the same signal from each of the active sectors and, on a frame-by-frame basis, may select the best signal to use.

A mobile station maintains in its memory a list of the sectors in its "active" set. In addition, it maintains in its memory a list of "candidate" sectors (e.g., up to six), which are those sectors that are not yet in the active set but that have sufficient signal strength that the mobile station could demodulate signals from those sectors. Further, the mobile station maintains a list of "neighbor" sectors, which are those sectors not in the active set or candidate set but are in close vicinity to the mobile station. All other possible sectors are members of a "remaining" set.

In existing systems, to facilitate a determination of which sectors should be in the mobile station's active set, all base stations emit a pilot channel signal on each sector, typically at a power level higher than other downlink signals. A mobile station then constantly measures the strength ($E_c/I_o$, i.e., energy versus spectral density) of each pilot that it receives and notifies the RAN (e.g., a BSC serving the mobile station) when pilot strength falls above or below designated thresholds. The RAN, in turn, provides the mobile station with an updated list of active pilots.

In one arrangement, for instance, the RAN may initially transmit to the mobile station (e.g., over a downlink control channel or traffic channel) a Handoff Direction Message (HDM), containing parameters such as (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the RAN may initially provide the mobile station with a Neighbor List Update Message (NLUM), which identifies the "neighbor" sectors for the current active set.

The mobile station may then monitor all of the pilot signals that it receives, and the mobile station may determine if any neighbor pilot exceeds T_ADD by T_COMP. If so, the mobile station may add the pilot to its "candidate" set and send a Pilot Strength Measurement Message (PSMM) to the base station, indicating the estimated $E_c/I_o$ for the pilot, with the pilot designated by PN offset. Depending on current capacity and other issues, the RAN may then agree to allow the mobile station to hand off to the designated sector. Accordingly, the RAN may reserve a channel resource (such as a Walsh code) in the sector and may send to the mobile station (e.g., via each of the mobile station's current active set sectors) an HDM listing the pilot as a new member of the mobile station's active set and directing the mobile station to use the reserved channel resource in the added sector. Further, the RAN may send to the mobile station a new NLUM, designating a new neighbor list corresponding to the mobile station's revised active set.

Upon receipt of the HDM, the mobile station would then add the pilot to its active set as instructed, and the mobile station would send a Handoff Completion Message (HCM) to the RAN, acknowledging the instruction, and providing a list of the pilots (PN offsets) in its active set, thereby completing the handoff.

Similarly, if the mobile station detects that the signal strength of a pilot in its active set drops below T_DROP, the mobile station may start a handoff drop timer. If T_TDROP passes, the mobile station may then send a PSMM to the RAN, indicating the $E_c/I_o$ and drop timer, and similarly designating the pilot by PN offset. The RAN may then respond by sending an HDM to the mobile station, without the pilot in the active set. And the mobile station may then receive the HDM and responsively move the pilot to its neighbor set and send an HCM to the RAN. Further, the base station may likewise send a new NLUM to the mobile station to update the mobile station's neighbor list.

To facilitate handoff of a mobile station from one sector to another, nearby sectors of a cellular system should have distinct identifiers that the mobile station and RAN can reference when engaging in handoff signaling. In a CDMA system, for instance, nearby sectors have distinct PN offsets, and the PSMM, HDM, and HCM signals reference to those PN offsets. In other types of cellular systems, other types of sector identifiers may be used.

Provided with such distinct sector-identifiers, when a mobile station requests handoff to a sector designated by a particular identifier, the RAN can readily determine which sector the mobile station means, and if appropriate the RAN can reserve resources in that sector and direct the mobile station to hand off to the sector. Accordingly, it is generally important that all of the sectors to which a mobile station can hand off from the current serving sector(s) have different identifiers from each other.

If two or more sectors were to have the same identifier as each other and are near enough to each other, the identifier could give rise to ambiguity. In particular, if a mobile station detects a strong pilot from one such sector and requests handoff by reference to the sector identifier, the RAN would not know which sector the mobile station means. In a worst case, the RAN could assume the mobile station means a particular one of the sectors and could reserve resources in that sector, but the pilot actually received by the mobile station could have been in another sector altogether. In that case, when the RAN grants the mobile station's handoff request, the mobile station may be unable to communicate on the sector, and the mobile station may experience a dropped call, which could result in a poor user experience.

On the other hand, cellular systems are typically designed to re-use sector identifiers or other parameters for sectors that are deemed to be located far enough apart from each other that such ambiguity would not arise. One reason to re-use sector identifiers in this manner is to conserve a potentially limited supply of sector identifier values. For instance, a CDMA system typically uses a limited number of PN offsets, so that mobile stations will only have to scan the airwaves for those particular PN offsets. Consequently, in a typical CDMA system, sectors that are deemed to be located far enough apart from each other may have the same PN offset as each other, while sectors that are located closed to each other should not have the same PN offset as each other.

Considering this ambiguity problem, a CDMA RAN is also typically arranged to allow a mobile station to hand off only to sectors that are listed in the mobile station's current neighbor list, since those sectors are assumed to be close enough to the mobile station's current serving sector(s), and since, by design, those sectors would not have the same identifiers as each other. In practice, a mobile station may detect a strong pilot from a sector not in the mobile station's neighbor list, and the mobile station may report it to the RAN. However, upon receipt of such a request, a CDMA RAN would not direct a handoff to the indicated sector, because the sector is not a member of the mobile station's current neighbor list. Rather, the RAN may simply record the pilot measurement for later engineering analysis or for other purposes.

OVERVIEW

Unfortunately, however, a strict prohibition on handoff to sectors that are not in a mobile station's neighbor list (or the like) can itself be a problem. Through engineering error or for other reasons, such as recent changes in topography, etc., it is possible that a mobile station's neighbor list would not include a sector that is actually the strongest or only sector available to serve the mobile station. If the RAN precludes handoff to such a sector, and if the mobile station loses contact with the mobile station's current serving sector(s), the mobile station may experience a dropped call, which again could result in poor user experience. Therefore, an improvement is desired.

The present method provides such an improvement, applicable in a scenario where it is unclear which of two of more sectors should serve a mobile station. As such, the method may apply when a mobile station requests handoff by reference to a sector-identifier or other parameter that could equally represent two or more sectors. In that case, the RAN would need to determine which of the sectors is or should be the handoff target for the mobile station, so that the RAN can then facilitate handoff to that sector.

If the method is applied in a CDMA system or other system that uses neighbor lists or the like, the ambiguous sector-identifier (or other parameter) may be an identifier that is not currently included in the mobile station's neighbor list. Under normal CDMA procedures as described above, the RAN would thus not permit handoff to the sector. In accordance with the method, however, the RAN will instead apply a process to intelligently determine which of the two of more sectors is the intended handoff target, and the RAN may then safely reserve resources in that sector and direct the mobile station to hand off to that sector.

As presently contemplated, in order to determine which of the two or more sectors is the intended handoff target for the mobile station, the RAN will send a test probe on one or more of the potential target sectors and will await a response from the mobile station, indicating the sector on which the mobile station received the test probe. If appropriate, the RAN will then direct the mobile station to hand off to the indicated sector.

In practice, for instance, the RAN may receive from a mobile station a request for handoff that carries an ambiguous parameter, such as an ambiguous PN offset, representing two or more potential target sectors. In response, the RAN may then identify a plurality of potential sectors for the requested handoff, such as by referring to stored data to identify sectors that are each represented by the ambiguous parameter. In turn, the RAN may then transmit on a first one of the potential sectors (i.e., just on the first sector and not on the others) a first test probe and then determine whether the mobile station responds to that first test probe. If the RAN determines that the mobile station responds to the first test probe, then the RAN may sensibly direct the mobile station to hand off to the first sector in response to the handoff request. Otherwise, the RAN may sensibly not direct the mobile station to hand off to the first sector in response to the handoff request.

If the RAN determines that the mobile station does not respond to the first test probe, indicating that the first sector is not the intended handoff target, then the RAN may proceed to test a second sector. In particular, the RAN may send a second test probe on a second sector of the identified potential sectors and determine whether the mobile station responds to the second test probe. If the RAN determines that the mobile station responds to the second test probe, then the RAN may sensibly direct the mobile station to hand off to the second sector in response to the handoff request. Otherwise, the RAN may sensibly not direct the mobile station to hand off to the second sector in response to the handoff request, and the RAN may proceed to test a third sector, and so forth.

Alternatively, the RAN may more quickly send test probes on a plurality of potential target sectors at once and await a response from the mobile station to determine which of the potential target sectors is the intended target sector. In particular, the test probes on each potential target sector may be coded in a manner (e.g., a binary pattern) that uniquely indicates the sector on which it is transmitted, and the mobile station's response to a received test probe may indicate the unique coding. That way, when the RAN receives the mobile station response, the RAN can determine the sector on which the mobile station received the test probe, and the RAN can sensibly conclude that that sector is the intended handoff target. The RAN may thus direct the mobile station to hand off to that determined sector in response to the handoff request.

In a further respect, the method may also involve using the identification of intended handoff target as a basis to modify a neighbor list for other mobile stations that are geographically nearby the mobile station at issue. In particular, once the RAN has resolved the ambiguity between potential handoff targets, the RAN may then identify at least one other mobile station that is geographically nearby and that has the same active set as the mobile station at issue. Such an other mobile station is likely to encounter the same issue with ambiguous sector identifiers. Thus, the RAN may autonomously add the identified sector to the neighbor list of the other mobile station, to enable the other mobile station to unambiguously request handoff to that sector if appropriate. The RAN may then remove the added sector from the neighbor list of the other mobile station after a period of time indicated by a predefined aging timer.

In the various embodiments of this method, the RAN may receive the handoff request from the mobile station via the mobile station's active set sectors, and the handoff request may indicate that the mobile station has measured a pilot signal strength at least a threshold higher than the highest pilot signal strength that the mobile station has measured for its active set sectors. For instance, in CDMA system or the like, the ambiguous parameter may comprise a PN offset that is not contained in a neighbor list of the mobile station at the time the RAN receives the handoff request, and the handoff request may comprise a PSMM indicating that the strength of the detected pilot signal exceeds a strongest active set sector pilot strength by the T_ADD threshold.

These as well as other aspects and advantages will become apparent to those of ordinary skill in the art by reading the following detailed description, with reference where appropriate to the accompanying drawings. Further, it should be understood that the descriptions provided in this summary and below are intended to illustrate the method by way of example only and not by way of limitation.

DETAILED DESCRIPTION

Figure 1:
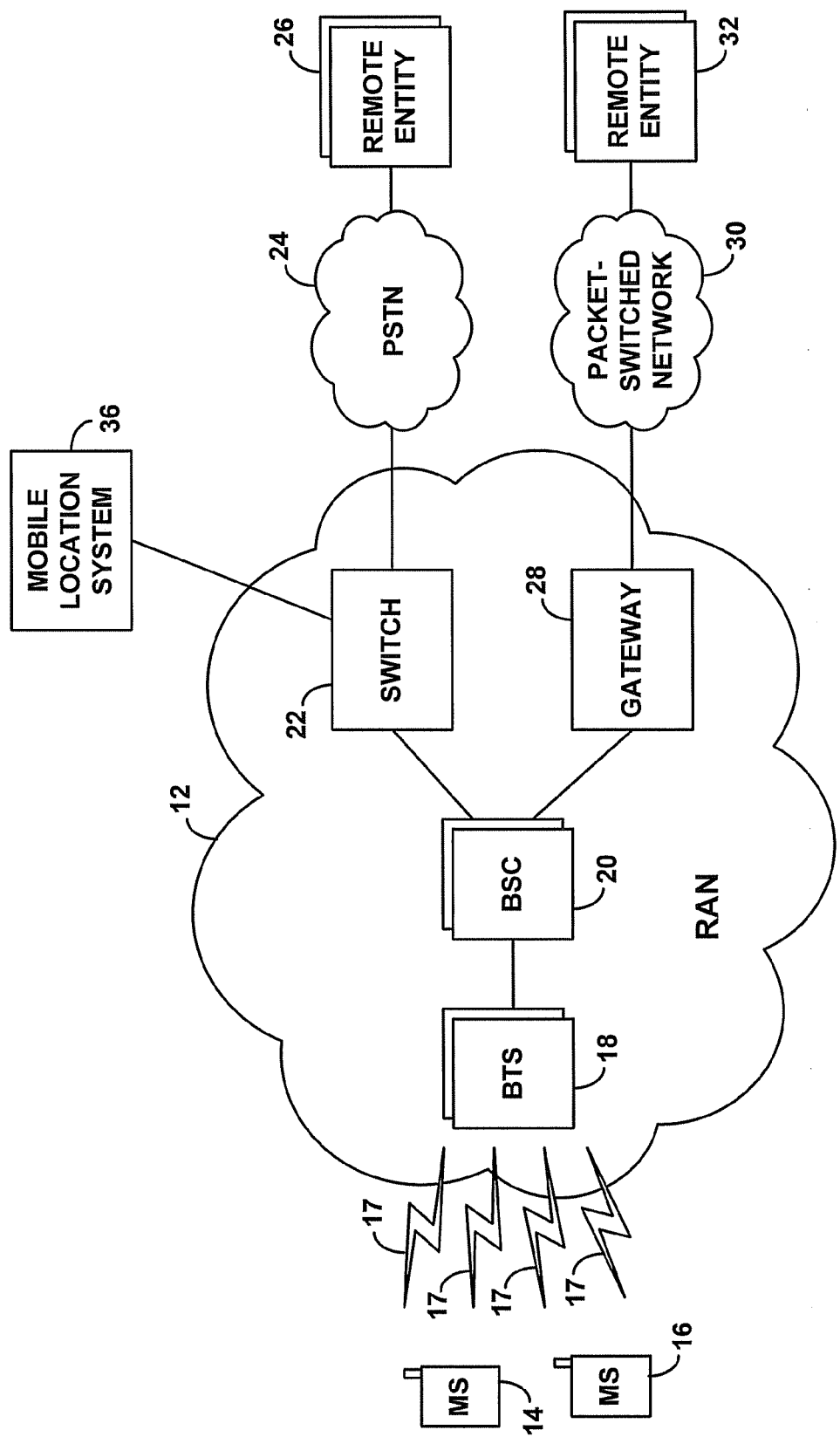
FIG. 1 is a simplified block diagram of a communication system in which an exemplary embodiment of the method can be implemented.

Referring to the drawings, FIG. 1 depicts a cellular communication system in which aspects of the exemplary method can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts two representative mobile stations 14, 16 by way of example, either or each of which could be a cell phone, wirelessly equipped PDA, or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1 xRTT, 1xEV-DO, etc.), iDEN, WiMAX, TDMA, AMPS, GSM, GPRS, UMTS, EDGE, LTE, or any other communication protocol now known or later developed.

RAN 12 defines a plurality of sectors (i.e., any wireless coverage areas established by reference to base station emissions or the like) in which mobile stations can communicate with the RAN. In particular FIG. 1 shows the RAN radiating to define four example sectors 17. The RAN may define these sectors discretely through use of directional antennas and/or by various modulation parameters, including, without limitation, carrier frequencies and PN offsets or other parameters, depending on the air interface protocol used.

The RAN can take various forms and may include any of a variety and number of components, depending for instance on the air interface protocol employed by the RAN. For example, the RAN may include one or more base transceiver stations (BTSs) 18 and one or more base station controllers (BSCs) 20 (also sometimes referred to as radio network controllers (RNCs)). The BTSs preferably include directional antennas, power amplifiers, and associated transceiver equipment arranged to establish the sectors shown and to communicate with served mobile stations.

In turn, each BSC 20 may control one or more BTSs and may manage aspects of air interface operation. For instance, a BSC may manage assignment of air interface traffic channels to mobile stations in response to mobile station origination messages. Further, the BSC may manage handoff of mobile stations between sectors, by engaging in control channel signaling such as that described above.

For instance, the BSC may first transmit to the mobile station a neighbor list for a sector initially selected sector upon call origination. The BSC may then receive PSMMs from the mobile station, reporting on pilot signal strengths detected by the mobile station, and the BSC may send HDMs to the mobile station, directing the mobile station to add or remove particular sectors from the mobile station's active set, i.e., to hand off from one sector to another as described above. In addition, each time the mobile station's active set changes, the BSC may provide the mobile station with a new neighbor list corresponding with the members of the mobile station's active set.

Each BSC may be coupled with a mobile switching center (MSC) or other switch 22 that provides connectivity with the public switched telephone network (PSTN) 24 if applicable, so that served mobile stations can communicate with remote entities 28 on the PSTN. And each BSC may be coupled with a packet data serving node (PDSN) or other gateway 30 that provides connectivity with a packet-switched network 32 if applicable, so that served mobile stations can communicate with remote entities 34 on the packet-switched network.

The example communication system of FIG. 1 also includes a mobile positioning system that facilitates determination of the location of mobile stations in accordance with well known principles. As shown in FIG. 1, for instance, a mobile location system (MLS) 36 can be linked with MSC 22 or another RAN element via a signaling network and/or via a general packet-data network. The MLS 36 may function as a location server, able to maintain records of mobile station location and to report mobile station locations to querying entities. The MLS may determine the location of a mobile station through interaction with position determining equipment (not shown), which may be network-based (e.g., triangulation mechanisms) or handset-based (e.g., GPS-based).

For high precision location determination, the MLS 36 may engage in signaling with the mobile station itself, according to well known industry standard IS-801 for example. In that process, the mobile station may report cellular signal measurements to the MLS, the MLS may use those measurements to determine roughly where the mobile station is located, and the MLS may then provide the mobile station with appropriate satellite assistance data to enable the mobile station to tune to particular satellites in its area. Based on signals that the mobile station then receives from those satellites, the mobile station or the MLS may then compute the mobile station's location with a high degree of accuracy. And the MLS may report that determined location to a querying entity. By the same token, some other entity (such as a RAN entity) may directly request the mobile station to report the mobile station's GPS-determined location, and the mobile station may compute its location by reference to satellite signals and then return its reported location to the querying entity.

Figure 2:
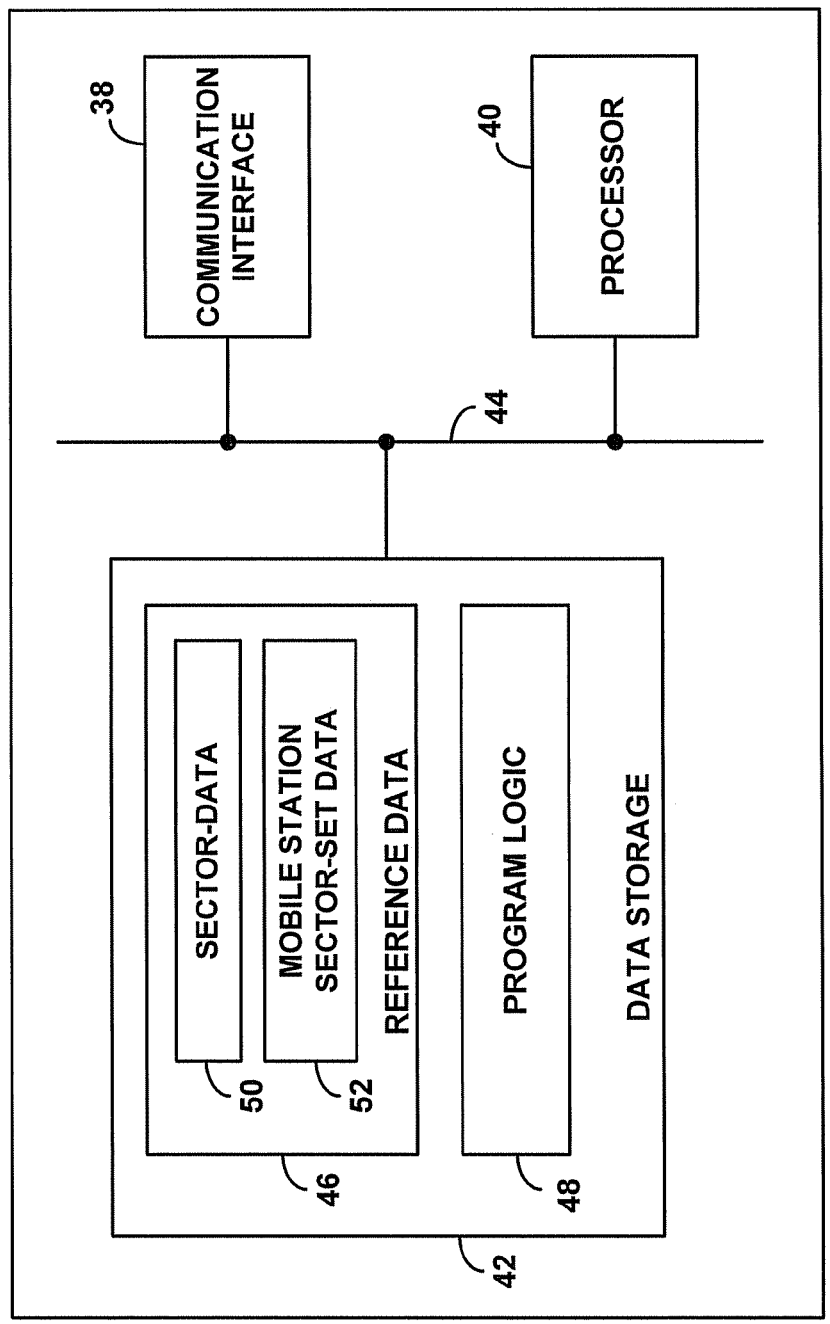
FIG. 2 is a simplified block diagram of an entity arranged to implement aspects of the exemplary method.

Aspects of the present method may be carried out by one or more RAN entities shown in FIG. 1, or by one or more other entities. For instance, aspects may be carried out by BTS 18, BSC 20, by switch 22, and/or by some other entity (such as a controlling server (not shown) coupled with the various entities shown). FIG. 2 is a simplified block diagram depicting functional components of such an entity (e.g., combination of entities). As shown, the entity includes by way of example a communication interface 38, a processor 40, and data storage 42, coupled together by a system bus, network, or other connection mechanism 44.

Communication interface 38 may include one or more communication interface mechanisms that enable the entity to communicate with various other entities. As such, the communication interface may take various well known forms, depending factors such as the type of communication links in use. Processor 40 may comprise one or more general purpose processors (e.g., INTEL processors) and/or one or more specialized processors (e.g., digital signal processors and/or application specific integrated circuits). And data storage 42 may comprise one or more volatile and/or non-volatile storage components, such as optical, magnetic, or organic storage components and may integrated in whole or in part with processor 40.

As shown, data storage 42 may hold reference data 46 and program logic 48. The reference data may comprise sector-data 50 and mobile station sector-set data 52.

The sector-data 50 preferably identifies various sectors in the region. For each sector, as an example, the sector-data may specify at least (i) a PN offset and/or other parameter used to identify the sector, and (iv) the PN offset and/or other identifier of each sector that is considered a neighbor of the sector. This sector-data 50 can be established by engineering design when a base station is put in place or is adjusted.

In addition, the sector-data 50 may include a record of how loaded each sector currently is, such as what portion of the sector's resources (e.g., traffic channels, timeslots, etc.) are currently in use. The RAN (e.g., BSC) may establish this load data dynamically as usage changes over time. Further, the RAN may use this load data, among possibly other data, as a basis to determine whether to admit (e.g., hand off) a mobile station to a given sector, such as by allowing a handoff to a sector only if the sector does not have a threshold load.

The mobile station sector-set data 52, in turn, comprises data for each mobile station that is currently being served by the RAN, and indicates for each such mobile station one or more sectors in which the mobile station is currently operating or with which the mobile station is otherwise currently associated. In a CDMA system or the like for instance, the sector-set data 52 may define each mobile station's current active set. Through PSMM and HDM messaging, a mobile station's active set may be established and updated, and the RAN may correspondingly update the sector-set data 52, so that the RAN always has a record of the mobile station's current active set. Furthermore, when necessary, the RAN may determine the neighbor list for a given mobile station, by considering the mobile station's active set and the neighboring-sector information in the sector-data 50.

The program logic 48 may comprise machine language instructions executable by processor 40 to carry out various functions described herein. For example, the program logic 48 may be executable to receive from a mobile station a handoff request (e.g., a PSMM) that designates a sector by an ambiguous identifier, i.e., an identifier that represents more than one sector. Further, the program logic 48 may then be executable in accordance with the exemplary process to responsively determine which of the sectors the mobile station means, i.e., which sector should be a handoff target for the mobile station, and to then approve, invoke, or otherwise facilitate a handoff to that sector.

Figure 3:
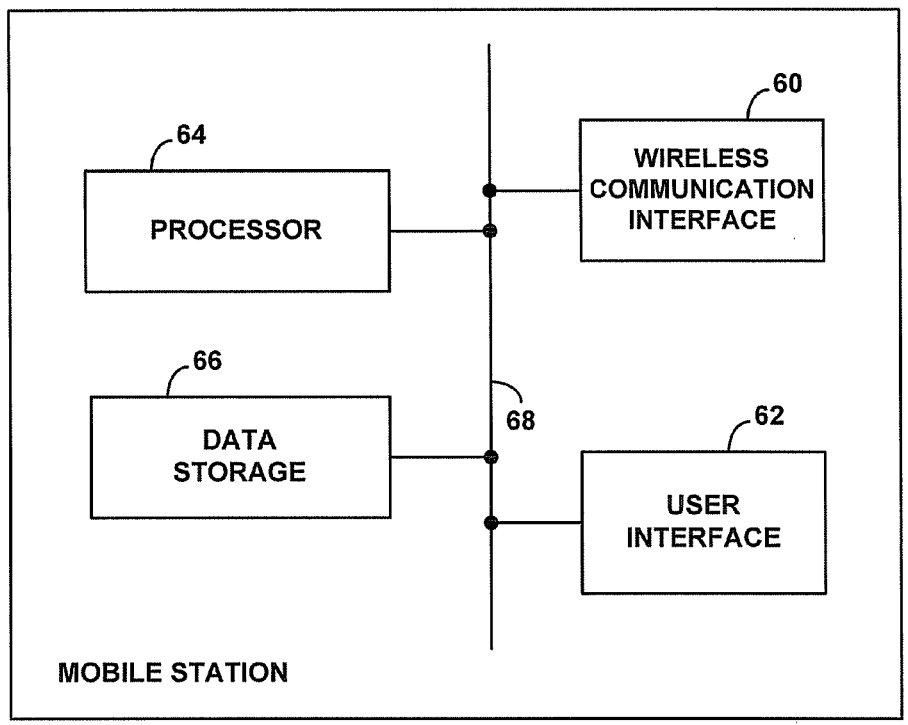
FIG. 3 is a simplified block diagram of a mobile station that may seek handoff and interact with a RAN in accordance with the exemplary method.

FIG. 3 is next a simplified block diagram depicting, by way of example, functional components of a mobile station that may seek handoff and interact with a RAN in accordance with the present method. As shown, the mobile station includes a wireless communication interface 60, a user interface 62, a processor 64, and data storage 66, all of which may be communicatively linked together by a system bus, network, or other connection mechanism 68.

Wireless communication interface 60 functions to facilitate air interface communication with RAN 12 according to one or more protocols such as those noted above. In the preferred embodiment, wireless communication interface 60 supports CDMA communication. As such, the wireless communication interface 60 preferably includes a transceiver having a rake receiver (not shown) of the type well known in the art, which enables mobile station 14 to tune to particular PN offsets, so as to facilitate scanning various sectors, and so forth. An exemplary wireless communication interface is an MSM series chipset manufactured by Qualcomm Incorporated, together with one or more internal or external antennas.

User interface 62 includes components for receiving input from a user of mobile station and providing output to a user of the mobile station. For instance, the user interface may include a keypad, touch-sensitive screen, microphone, and camera for receiving user input, and a display screen and speaker for providing user output. Further, the user interface 62 may include analog/digital conversion circuitry to facilitate conversion between analog user input/output and digital signals on which the mobile station can operate.

Processor 64 comprises one or more general purpose processors (such as INTEL processors or the like) and/or one or more special purpose processors (such as digital signal processors or application specific integrated circuits). To the extent processor 64 includes more than one processor, the processors could work separately or in combination. Further, the processor 64 may be integrated in whole or in part with the with wireless communication interface 60 or with other components.

Data storage 66, in turn, comprises one or more volatile or non-volatile storage components, such as optical, magnetic, or organic storage, and data storage 66 can be integrated in whole or in part with processor 64. In the exemplary method, data storage 66 may contain program logic executable by processor 64 to carry out various mobile station functions described herein, such as requesting handoff, and detecting and responding to test probes to facilitate disambiguation of a reported sector.

Figure 4:
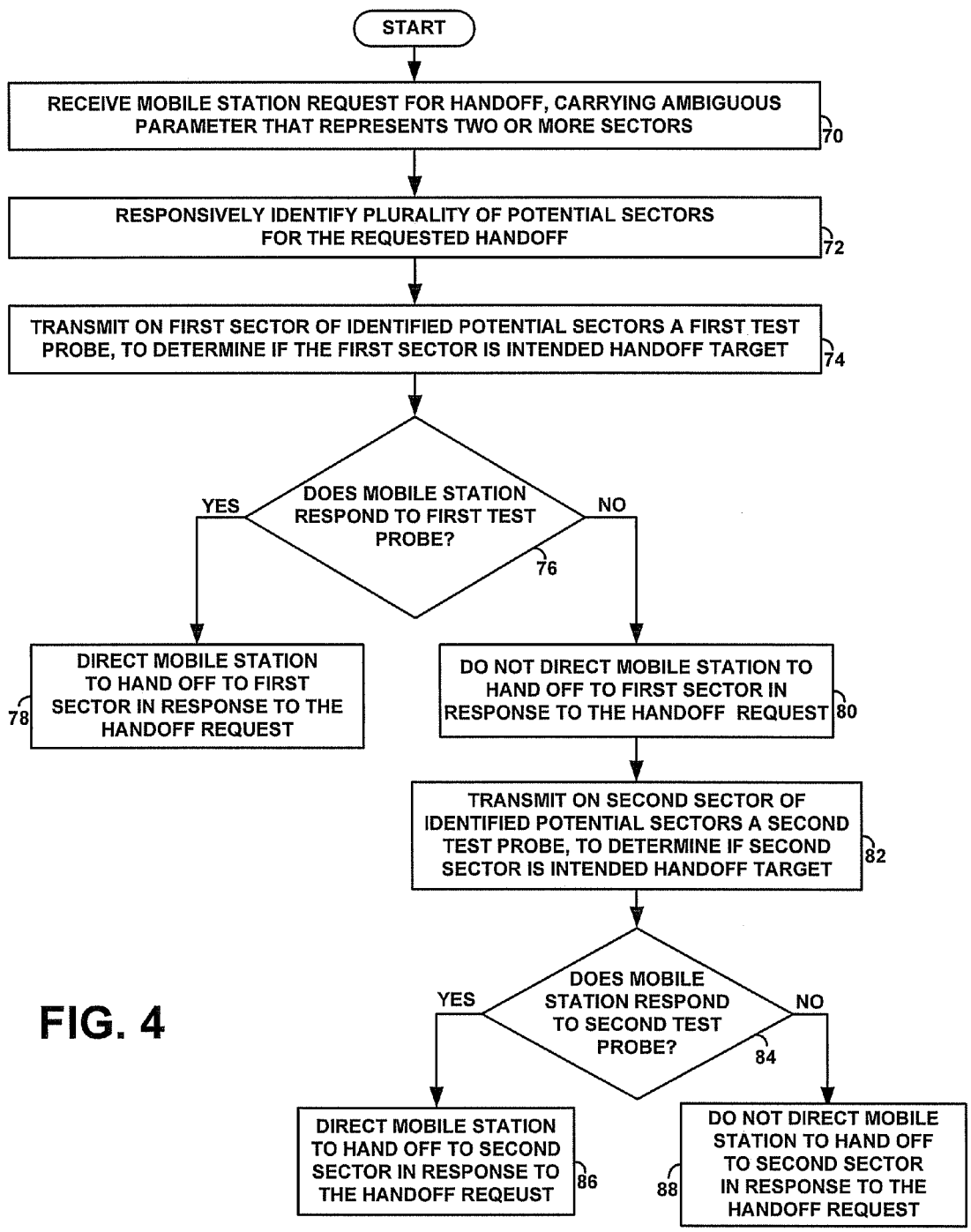
FIG. 4 is a flow chart depicting functions that can be carried out in accordance with the exemplary method.

FIG. 4 is a flow chart depicting functions that can be carried out in accordance with the exemplary method, primarily to disambiguate sectors or other wireless coverage areas so as to facilitate handoff of a mobile station served by a RAN. In particular, the method may operate to facilitate handoff of mobile station 14 served by RAN 12.

As shown in FIG. 3, at step 70, the method may begin with RAN 12 receiving from mobile station 14 a request for handoff of mobile station 14, where the handoff request carries an ambiguous parameter that represents two or more sectors. At step 72, the method then involves responsively identifying a plurality of potential sectors for the requested handoff, such as by referring to stored data to identify the plurality of potential sectors as sectors that are each represented by the ambiguous parameter. At step 74, the method then involves transmitting from the RAN on a first sector of the identified potential sectors a first test probe, to determine if the first sector is the intended handoff target.

At step 76, the method next involves making a first determination of whether the mobile station responds to the first test probe, namely whether a response to the first test probe is received from the mobile station. If the first determination is that the mobile station responds to the first test probe, then, at step 78, the method involves directing the mobile station to hand off to the first sector in response to the handoff request. Whereas, if the first determination is that the mobile station responds does not respond to the first test probe, then, at step 80, the method involves not directing the mobile station to hand off to the first sector in response to the handoff request.

At step 82, where the determination was that the mobile station does not respond to the first test probe, the method may then involve transmitting a second test probe from the radio access network on a second sector (i.e., another one) of the identified potential sectors, to determine if the second sector is the sector is the intended handoff target. At step 84, the method would then involve making a second determination of whether the mobile station responds to the second test probe, namely whether a response to the second test probe is received from the mobile station. If the second determination is that the mobile station responds to the second test probe, then, at step 86, the method would then involve directing the mobile station to hand off to the second sector in response to the handoff request. Whereas, if the second determination is that the mobile station does not respond to the second test probe, then, at step 88, the method would involve not directing the mobile station to hand off to the second sector in response to the handoff request. In that case, the method may then continue by testing one or more additional potential handoff targets, if any, represented by the ambiguous parameter, in a similar manner.

In this method, the act of receiving the handoff request from the mobile station may take various forms, depending on the air interface protocol at issue. In a CDMA system, for instance, the act may involve receiving a PSMM from the mobile station, via one or more of the mobile station's active set sectors. Such a PSMM may indicate that the mobile station measured a pilot signal strength at least a threshold higher than a highest pilot signal strength of the mobile station's active set sector, and the PSMM would identify the pilot by a PN offset that ambiguously represents two or more sectors rather than representing just the one sector whose pilot the mobile station actually received. As discussed above, for instance, this may happen when the reported PN offset is not listed in the mobile station's neighbor list and is used to identify two or more sectors in the region.

As noted above, the act of identifying a plurality of potential sectors for the requested handoff may involve first referring to the mobile station sector-set data 52 to determine that the reported PN offset (or other parameter) does not represent a sector in the mobile station's neighbor list. In turn, as noted above, the act may involve referring to stored data so as to identify the plurality of potential sectors as sectors that are each represented by the ambiguous parameter. In practice, for instance, the stored data may be the sector-data 50, which indicates the PN offset (or other identifying parameter) of each of various sectors. By reference to that data, the RAN may determine that multiple sectors have the PN offset indicated by the mobile station's PSMM. The multiple sectors could be selected from among those in a designated region such as those emanating from base stations within a designated geographic radius of the mobile station's current location (as determined by location system 36 for instance).

The act of transmitting a test probe on a first sector of the identified potential sectors may in turn also take various forms. In an example implementation, for instance, the RAN may first send to the mobile station on the mobile station's active set sectors a control message informing the mobile station that the RAN is about to transmit a test probe to the mobile station. This control message can be sent in much the same way that the RAN normally sends an HDM to the mobile station after receiving a handoff request, but the message would be coded in a way that the mobile station is programmed to interpret as an indication that a test probe is about to be sent. In turn (perhaps at some predefined period after sending the control message), the RAN will then send the test probe on the first sector.

Optimally in CDMA, the RAN can transmit the test probe on a special Walsh code that will be reserved for this purpose, such as Walsh code 33 for instance, so a mobile station can look to that Walsh code in an effort to detect the test probe. Furthermore, the RAN can structure the test probe as a unique binary sequence that is predefined to be a test probe (e.g., contrasted with all zeros that is typically used as a pilot signal) and that the mobile station is programmed to detect as a test probe in accordance with this method. In practice, a searcher of the mobile station may be programmed to search for test probes having such sequences on the special Walsh code. Alternatively, another mechanism could be used to enable the mobile station detect and respond to the test probe.

In accordance with the method, if the mobile station receives the test probe, the mobile station will then programmatically (automatically) send a response message to the RAN indicating that the mobile station received the test probe. For instance, the mobile station may send the response message on a reverse traffic channel on one or more of its active set sectors, in much the same way that the mobile station sent the PSMM in the first place.

The RAN may wait a predefined period of time for the mobile station to send a response indicating that the mobile station received the test probe transmitted on the first sector. If the predefined period of time expires without the RAN receiving such a response from the mobile station, the RAN may then programmatically conclude that the mobile station did not receive the test probe transmitted on the first sector, and the RAN may then proceed to test mobile station receipt of a test probe on the second sector, in much the same way. In an alternative embodiment where there are only two potential handoff targets represented by the ambiguous parameter, the RAN may simply conclude that the second sector is the intended handoff target once the RAN has determined that the mobile station did not respond to a test probe sent on the first sector.

Once the RAN determines through this process which sector the mobile station intended as the handoff target, the RAN may then grant the mobile station's handoff request. For instance, the RAN may transmit a conventional HDM to the mobile station, directing the mobile station to hand off to the indicated sector. The RAN may of course also take into consideration sector load and/or one or more other factors when deciding whether to grant the requested handoff.

As noted above, once the RAN has disambiguated a sector in accordance with the present method, the RAN may also add the identified sector into the neighbor list of at least one other mobile station that has the same active set as the mobile station at issue and perhaps that is geographically nearby the mobile station at issue, so as to enable that other mobile station to also handoff to the identified sector if appropriate.

To accomplish this in practice, the RAN may refer to the mobile station sector-set data 52 to identify any other served mobile stations that have the same active set as mobile station 14. For each such identified other mobile station, the RAN may then determine the geographic location of the identified mobile station and the geographic location of mobile station 14, both by interaction with mobile location system 36 for instance. And the RAN may then determine based on those geographic locations whether the other mobile station is located within a threshold small distance from mobile station 14. For each mobile station thereby determined to have an active set in common with mobile station 14 and to be geographically nearby mobile station 14, the RAN may add the identified sector into the mobile station's neighbor list. That way, if the mobile station detects a sufficiently strong pilot from that sector and requests handoff to the sector, the RAN may grant the handoff without a need to disambiguate. As further noted above, the RAN may apply an aging timer and remove the added sector from the neighbor list upon expiration of the timer, to avoid having it linger there without continued justification.

Figure 5:
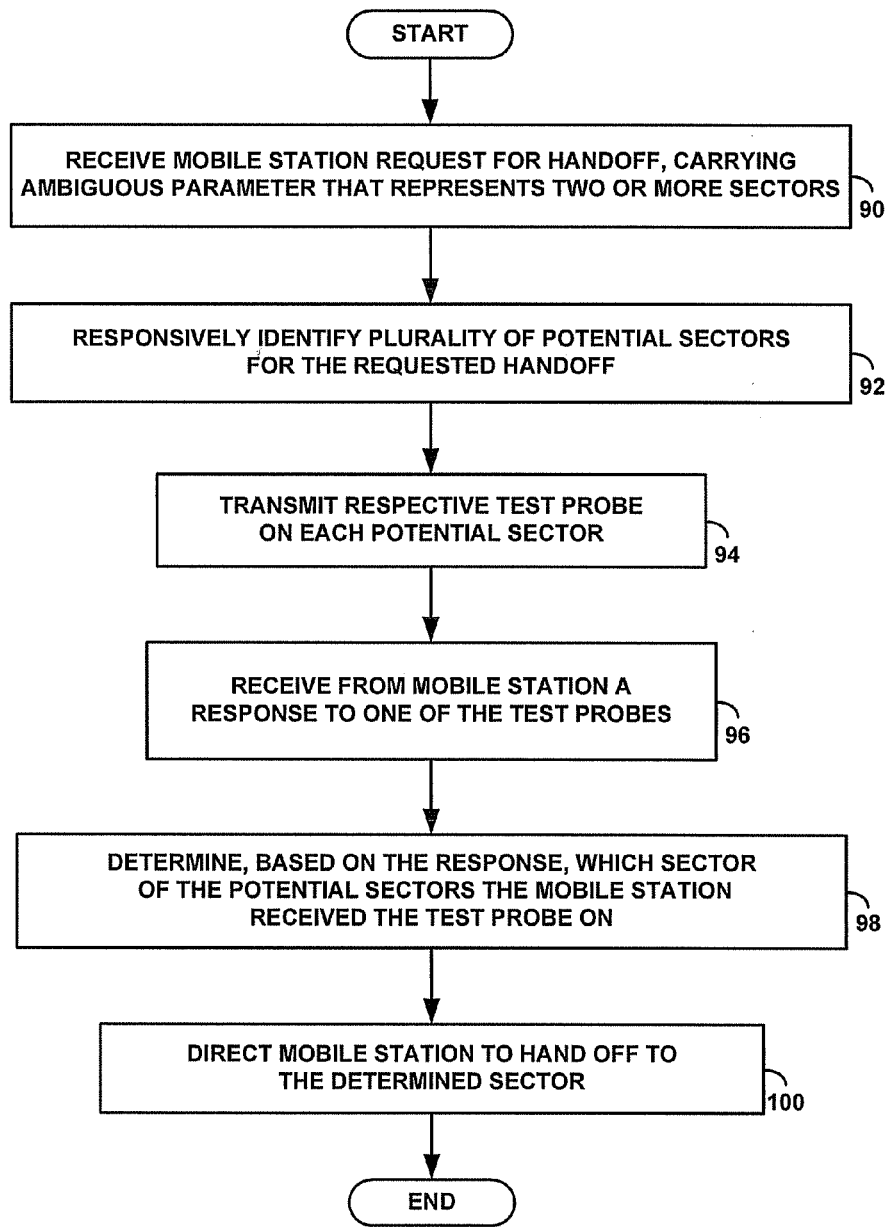
FIG. 5 is another flow chart depicting functions that can be carried out in accordance with the exemplary method.

FIG. 5 is next a flow chart depicting functions that can be carried out in accordance with an alternative embodiment of the exemplary method, again to disambiguate sectors or other wireless coverage areas so as to facilitate handoff of a mobile station served by a RAN. This method may similarly operate to facilitate handoff of mobile station 14 served by RAN 12 for instance.

As shown in FIG. 5, at block 90, the method may begin with RAN 12 receiving from mobile station 14 a request for handoff of mobile station 14, where the handoff request carries an ambiguous parameter that represents two or more sectors. At step 92, the method then involves responsively identifying a plurality of potential sectors for the requested handoff, again such as by referring to stored data to identify the plurality of potential sectors as sectors that are each represented by the ambiguous parameter.

At step 94, the method then involves transmitting from the RAN on each of the potential sectors a respective test probe, preferably all at the same time or substantially at the same time (e.g., sequentially, without waiting for a response to one before sending the next). In turn, at step 96, the method the involves receiving from the mobile station on at least one of the active set sectors a response to one of the test probes. And at step 98, the method involves determining, based on the response, which sector of the potential sectors the mobile station received the test probe on. In turn, at step 100, the method involves directing the mobile station to hand off to the determined sector.

Figure 6:
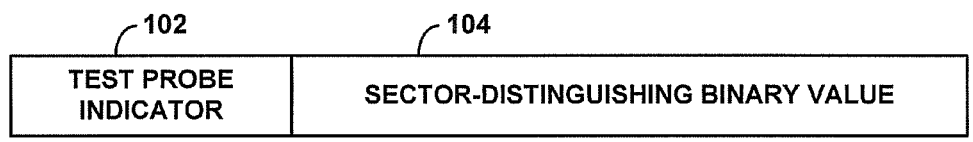
FIG. 6 depicts the structure of a test probe that can be transmitted in accordance with the exemplary method.

In this method, the test probe that the RAN sends respectively on each of the potential target sectors can be structured in a manner that indicates the test probe is a test probe and that further serves to uniquely associate the test probe with the sector on which it is transmitted. FIG. 6 depicts an example of such a structure, representing a binary pattern used as the test probe. As shown in FIG. 6, a first portion 102 of the test probe may be a binary value that the mobile station is programmed to interpret as an indication that the binary sequence is a test probe. In turn, a next portion 104 of the test probe may be a binary value that uniquely distinguishes the sector on which the test probe is transmitted from one or more other sectors of the potential sectors. For instance, if there are three potential sectors, there may be three binary values, one corresponding respectively with each of the potential sectors, and the RAN will programmatically keep track of this correspondence.

As in the method described above, the RAN may first transmit a control message to the mobile station on one or more of the mobile station's active set sectors, to notify the mobile station that the RAN is about to send a test probe. The mobile station will thus programmatically await receipt of the test probe.

In practice, the mobile station should optimally receive a test probe on just one of the potential sectors, namely, the one sector whose pilot signal the mobile station detected and reported to the RAN. When the mobile station receives a test probe in this method, the mobile station will then programmatically send a response message to the RAN indicating that the mobile station received the test probe. Optimally, the mobile station station's response message will indicate which test probe the mobile station received. For instance, the mobile station may include in the response the distinct binary value carried by the test probe, or the mobile station may in some other way provide an indication of that value. Thus, upon receipt of the response, the RAN may determine from the response which test probe the mobile station received, and so the RAN may then conclude that the mobile station received the test probe on the sector corresponding with the received test probe. The RAN may then direct the mobile station to hand off to that sector if appropriate.

In this method, like that described above, the RAN may further add the identified sector into the neighbor list of at least one other mobile station that has the same active set as the mobile station at issue. And again, the RAN may conditioning doing so on the other mobile station being geographically nearby the mobile station at issue. Further, the RAN may likewise apply an aging timer to remove the added sector from the neighbor list after a period of time.

Exemplary embodiments of the method have been described above. Those of ordinary skill in the art will appreciate, however, that modifications may be made to these embodiments while remaining within the scope defined by the claims.

We claim:

1. A method of facilitating mobile station handoff, the method comprising:
   receiving into a radio access network, from a mobile station served by the radio access network, a request for handoff of the mobile station, the request carrying an ambiguous parameter that represents two or more sectors;
   responsive to receiving the request for handoff carrying the ambiguous parameter,
   (i) identifying a plurality of potential sectors for the requested handoff, wherein identifying the plurality of potential sectors comprises referring to stored data to identify the plurality of potential sectors as sectors that are each represented by the ambiguous parameter, and
   (ii) transmitting from the radio access network on a first sector of the identified potential sectors a first test probe, and making a first determination of whether the mobile station responds to the first test probe;
   if the first determination is that the mobile station responds to the first test probe, then directing the mobile station to hand off to the first sector in response to the handoff request; and
   if the first determination is that the mobile station does not respond to the first test probe, then not directing the mobile station to hand off to the first sector in response to the handoff request.

2. The method of claim 1, further comprising, if the determination is that the mobile station does not respond to the first test probe, then:
   transmitting a second test probe from the radio access network on a second sector of the identified potential sectors;
   making a second determination of whether the mobile station responds to the second test probe;
   if the second determination is that the mobile station responds to the second test probe, then directing the mobile station to hand off to the second sector in response to the handoff request; and
   if the second determination is that the mobile station does not respond to the second test probe, then not directing the mobile station to hand off to the second sector in response to the handoff request.

3. The method of claim 1, further comprising:
   transmitting test probes on all of the sectors of the identified potential sectors, wherein the transmitting of the first test probe on the first sector is part of the transmitting of the test probes on all of the sectors;
   receiving a test probe response into the radio access network from the mobile station; and
   determining from the test probe response which sector of the identified potential sectors the mobile station received one of the test probes on, wherein making the determination of whether the mobile station responds to the first test probe comprises determining that the mobile station responds to the first test probe and thus that the mobile station received one of the test probes on the first sector.

4. The method of claim 3, wherein the first test probe defines a unique binary pattern usable to indicate that the first test probe is a test probe.

5. The method of claim 4, further comprising using the unique binary pattern as a basis to determine that the mobile station received the first test probe on the first sector.

6. The method of claim 3, wherein the test probe transmitted respectively on each sector defines a unique binary pattern distinguishing the test probe from each other test probe transmitted on each other sector, and wherein the test probe response is based on one of the unique binary patterns and thereby indicates the sector on which the mobile station received one of the test probes.

7. The method of claim 1, wherein the ambiguous parameter comprises a PN-offset that is not contained in a neighbor list of the mobile station when receiving the request for handoff.

8. The method of claim 7, further comprising:
   if the first determination is that the mobile station responds to the first test probe, then responsively adding the first sector to a neighbor list of another mobile station having an active set in common with the mobile station.

9. The method of claim 8, further comprising:
   conditioning the adding of the first sector into the neighbor list of the other mobile station on a determination that the other mobile station is geographically nearby the mobile station.

10. The method of claim 8, further comprising:
    applying an aging timer to remove the first sector from the neighbor list of the other mobile station after a defined period of time.

11. The method of claim 1, wherein before receiving the handoff request, the mobile station operates on active set sectors, wherein receiving the handoff request comprises receiving the handoff request via at least one of the active set sectors, wherein the handoff request indicates that the mobile station measured a pilot signal strength at least a threshold higher than a highest pilot signal strength of the active set sectors.

12. The method of claim 11, wherein the ambiguous parameter comprises a PN-offset that is not contained in a neighbor list of the mobile station when receiving the request for handoff, and wherein the handoff request comprises a Pilot Strength Management Message (PSMM).

13. A method of facilitating mobile station handoff, when a mobile station is operating on active set sectors of a wireless communication system and the mobile station has a neighbor list that does not list a particular PN-offset, the method comprising:
   receiving from the mobile station on at least one of the active set sectors a handoff request designating the particular PN-offset; and
   upon receipt of the handoff request, determining that the mobile station's neighbor list does not list the particular PN-offset and that the particular PN-offset ambiguously represents a plurality of potential sectors, and
   responsive to the determining, invoking a disambiguation process involving
   (i) on each sector of the plurality of potential sectors, transmitting a respective test probe,
   (ii) receiving from the mobile station on at least one of the active set sectors a response to one of the test probes, and (iii) determining, based on the response, which sector of the potential sectors the mobile station received a test probe on, and (iv) directing the mobile station to hand off to the determined sector.

14. The method of claim 13, wherein the test probe transmitted respectively on each sector defines a binary pattern that uniquely indicates the test probe is transmitted on the sector rather than on other sectors.

15. The method of claim 14, wherein the response is based on the unique binary pattern of the test probe received by the mobile station and thereby indicates the sector on which the mobile station received the test probe.

16. The method of claim 14, wherein the response indicates the unique binary pattern of the test probe received by the mobile station and thereby indicates the sector on which the mobile station received the test probe.

17. The method of claim 14, wherein the response contains the unique binary pattern of the test probe received by the mobile station and thereby indicates the sector on which the mobile station received the test probe.

18. The method of claim 13, further comprising:
responsive to determining the sector on which the mobile station received the test probe, adding the determined sector into a neighbor list of at least one other mobile station that has the same active set sectors as the mobile station.

19. The method of claim 18, further comprising:
conditioning the adding of the determined sector into the neighbor list of the at least one other mobile station on a determination that the at least one other mobile station is geographically nearby the mobile station.

20. The method of claim 18, further comprising:
applying an aging timer to remove the determined sector from the neighbor list of the at least one other mobile station after a defined period of time.

* * * * *